UNITED STATES PATENT OFFICE.

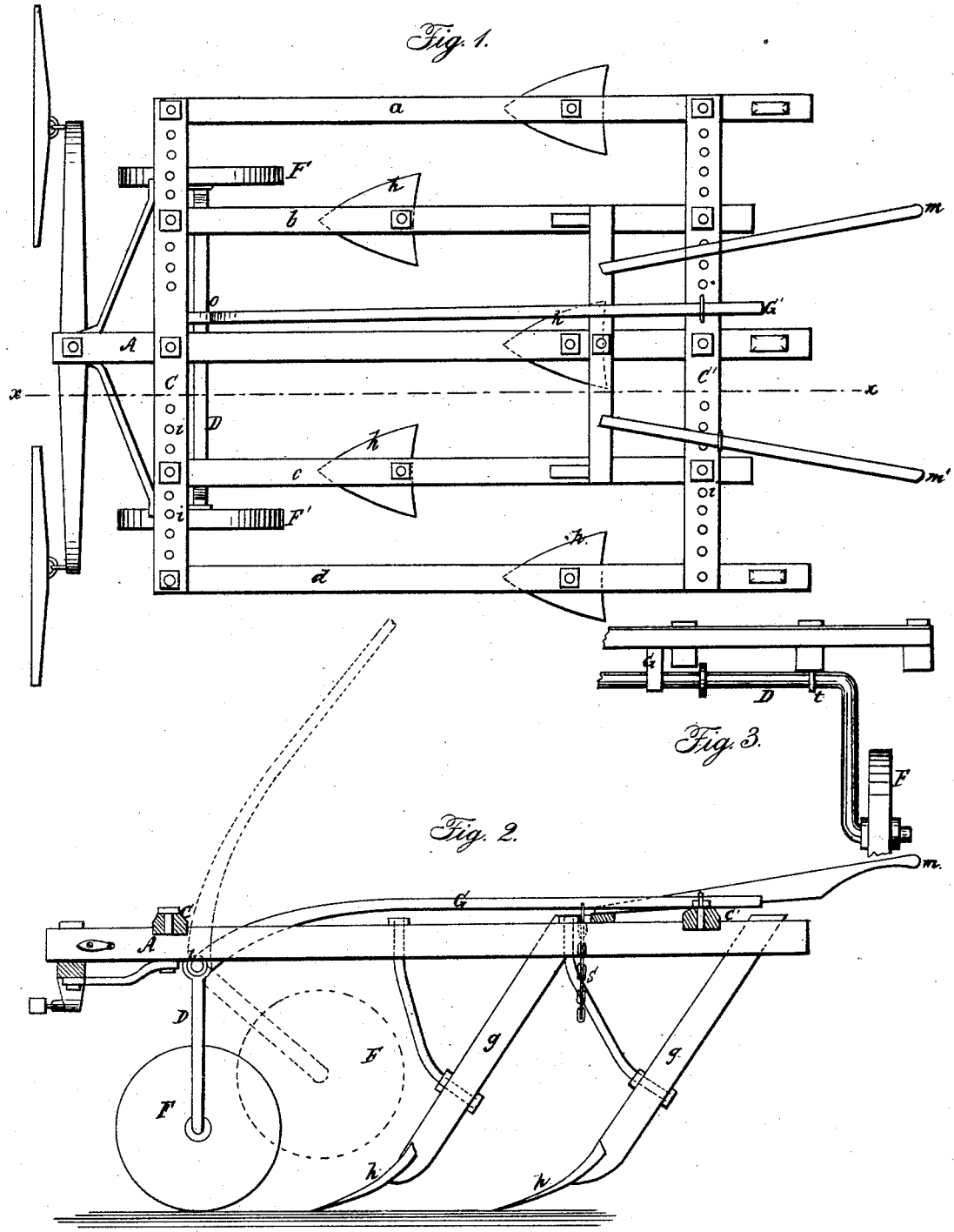

C. A. CLARK, OF BLOOMFIELD, IOWA.

IMPROVEMENT IN CULTIVATORS.

Specification forming part of Letters Patent No. 30,720, dated November 27, 1860.

*To all whom it may concern:*

Be it known that I, C. A. CLARK, of Bloomfield, in the county of Davis and State of Iowa, have invented a new and useful Improvement in Two-Horse Cultivators; and I do hereby declare that the following is a full, clear, and exact description of the same, reference being had to the annexed drawings, forming part of this specification, in the several figures of which similar characters of reference denote the same part.

Figure 1 is a plan view of the cultivator. Fig. 2 is a section of the same on line $x\ x$. Fig. 3 is a view showing connection of bent axle with wheel.

The nature of my invention consists in the arrangement of the crank-axle, gage or propelling wheels, lever, rear shares, forward shares, longitudinal bars, perforated transverse bars, and handles, all in the manner and for the purposes hereinafter described.

By my invention a cultivator which is drawn by horses and guided and controlled by a man at the rear can be steadily and conveniently adjusted without stopping the team, so as to pass over stumps or other obstructions, or so as to enter the soil to any desired depth.

The frame of the cultivator consists of the main beam A, to which the draft is applied, and the beams $a\ b\ c\ d$, which are secured and held together by cross-pieces C C'. Secured to said cross-pieces and braced as ordinarily are the stocks $g\ g'$, to which are attached the shovels $h\ h'$. The cross-pieces are provided with a series of holes, $i$, which, by reason of screw and nut, render the shovels capable of a relative adjustment, so as to increase or diminish the distance of the furrows apart. In the forward part of the cultivator is the bent axle D, working in bearings $t$. This axle is continued beyond its bearings, and so bent as to be pendent, upon the extremities of which revolve the guide-wheels F F'.

G is a lever secured to the bent axle D, as at $o$, and is held in any desired position by chain $s$, the depth of plowing being regulated and the shovels removed from the earth by the elevation or depression of said lever.

The operation of my invention is as follows: The operator, by raising the lever G, which, being secured to the bent axle D, upon the extremities of which revolve the wheels F F', causes it to turn in its bearings, as shown by dotted lines, Fig. 2, thereby allowing the shovels to enter the earth the desired depth, when, by depressing the lever, the wheels F F' assume the position shown in the drawings, causing the shovels to be removed from the earth. The operator, by raising the rear portion of the cultivator by handles $m\ m'$, can move it upon the wheels F F' to any desired place.

I do not claim broadly the use of a crank-axle with gage or propelling wheels in combination with a cultivator; nor do I claim broadly a cultivator with shares which can be set nearer together or farther apart; but What I do claim as my invention, and desire to secure by Letters Patent, is—

The arrangement of the crank-axle D, gage or propelling wheels F F', lever G, rear shares, $h'\ h'\ h'$, forward shares, $h\ h$, longitudinal bars A $a\ b\ c\ d$, transverse perforated bars C C, and handles $m\ m'$, all in the manner and for the purposes described.

In testimony whereof I have hereunto signed my name before two subscribing witnesses.

C. A. CLARK.

Witnesses:
H. B. SPENCER,
W. T. CARSON.